United States Patent [19]
Nielsen et al.

[11] 3,978,161

[45] Aug. 31, 1976

[54] METALATION OF POLYMERS

[75] Inventors: Stuart D. Nielsen, Stow; Ivan G. Hargis, Tallmadge; Russell A. Livigni, Akron, all of Ohio

[73] Assignee: The General Tire & Rubber Company, Akron, Ohio

[22] Filed: July 29, 1975

[21] Appl. No.: 600,177

Related U.S. Application Data

[63] Continuation of Ser. No. 402,439, Oct. 1, 1973, abandoned.

[52] U.S. Cl. ................................ 260/877; 526/20; 526/47; 526/2 W
[51] Int. Cl.$^2$ .................. C08L 51/00; C08L 53/00; C08F 6/00; C08F 8/00
[58] Field of Search ................ 260/94.7 A, 94.7 N, 260/877, 85.1, 85.3 R

[56] References Cited
UNITED STATES PATENTS

| | | | |
|---|---|---|---|
| 3,492,369 | 1/1970 | Naylor | 260/877 |
| 3,627,837 | 12/1971 | Webb | 260/877 |
| 3,703,566 | 11/1972 | Duck et al. | 260/877 |

FOREIGN PATENTS OR APPLICATIONS 1,173,508  12/1969  United Kingdom

OTHER PUBLICATIONS

Morton, "Metalation of Polystyrene," Journal of Organic Chemistry, 24, pp. 1167–1169, (1959).

*Primary Examiner*—Joseph L. Schofer
*Assistant Examiner*—Herbert J. Lilling

[57] ABSTRACT

Hydrocarbon polymers are readily metalated in solution in a hydrocarbon solvent with metallic sodium, potassium, rubidium and/or cesium utilizing a chelating polytertiary amine or a crown polyether.

6 Claims, No Drawings

METALATION OF POLYMERS

This application is a continuation of Ser. No. 402439, 10-1-73, and now abandoned.

DISCUSSION OF THE PRIOR ART

There are numerous reports in the literature of metalated polymers but, for the most part, the approaches used are specific to the type of polymer used. For example, poly(p-iodostyrene)[D. Braun, Makromol Chem. 30, 85–95 (1959)] and poly(p-bromostyrene)[F. C. Leavitt and L. U. Matternas, J. Polmer Sci. 45, 249–250 (1960)] have been metalated by butyllithium by exchange with the halogen atom and poly(p-bromostyrene) has similarly been metalated by the sodium adduct of naphthalene [A. Dondos and P. Rempp, Compt. Rend. 258, 4045–4047 (1964)], as has poly(p-chlorostyrene)[G. Greber and J. Tolle, Makromol. Chem. 53, 208–209 (1962); G. Greber, J. Tolle, and W. Burchard, Makromol. Chem. 71, 47–61 (1964); and G. Greber, Makromol. Chem. 101, 104–106 (1967)]. Metalation at a relatively acidic carbon-hydrogen bond has been used by A. Dondos and P. Rempp and by A. Dondos[Compt. Rend. 254, 1064 (1962); Compt. Rend. 254, 1426 (1962); Bull. Soc. Chim. France, 2313 (1962); Compt. Rend. 256, 4443 (1963); and Bull. Soc. Chim. France, 2762 (1963)] in the metalation of poly(3,3-diphenyl-1-propene) by the sodium adduct of naphthalene and by A. A. Morton and L. D. Taylor [J. Org. Chem. 24, 1167–1169 (1959)] in the metalation of polystyrene by potassium in the presence of sodium oxide; though in the latter case, only a 0.2% yield (as carboxylated polymer) was obtained. Metalation by electron transfer to a polymer with a relatively high electron affinity, such as poly($\beta$-vinylnaphthalene), poly(4-vinylbiphenyl) or poly(4-vinylpyridine), has been reported in several papers [A. Rembaum and J. Moacanin, J. Polymer Sci. B1, 41–45 (1963); A. Rembaum, J. Moacanin and E. Cuddihy, J. Polymer Sci. C4, 529–549 (1964); G. Goutiere and J. Gole, Bull. Soc. Chim. France, 153 (1965); G. Goutiere and J. Gole, Compt. Rend. 257, 674 (1963); G. Goutiere, J. B. Leonetti and J. Gole, Compt. Rend. 257, 2485 (1963); and Y. Minoura, M. Katano, and J. Kanesaka, Kogyo Kagaku Zasshi 74, 520 (1971)]. Similarly, poly(p-vinyl benzophenone) forms the polymeric ketyl [G. Greber and G. Egle, Makromol. Chem. 54, 136–142 (1962); and G. Greber, Makromol. Chem. 101, 104–106 (1967)].

Only recently has a more general metalation procedure been reported. The complex between N,N,N',N'-tetramethylethylenediamine (TMEDA) and an alkyllithium or alkyl sodium has been shown to metalate polydienes, polystyrene and poly(2,6-dimethyl-1,4-phenylene ether)[Y. Minoura, K. Shiina, and H. Harada, J. Polymer Sci, Part A-1, 6, 559–573 (1968); Y. Minoura and H. Harada, J. Polymer Sci, Part A-1, 7, 3–14 (1969); D. P. Tate, A. F. Halasa, F. J. Webb, R. W. Koch and A. E. Oberster, J. Polymer Sci, Part A-1, 9, 139–145 (1971); R. W. Koch, U.S. Pat. No. 3,598,793, Assigned to The Firestone Tire & Rubber Co.; British Patent No. 1,172,477, Assigned to Borg-Warner Corp.; Y. Minoura and M. Komaki, Japan Patent No. 70 26,742, to Nippon Kayaku Co. Ltd.; and A. S. Hay and A. J. Chalk, J. Polymer Sci, Part B, 6, 105–107 (1968)].

From an examination of the above cited references, the usefulness of polymer metalation for the modification of existing polymers by the addition of functional groups to the polymer or by their conversion to graft copolymers will become apparent.

OBJECTS

An object of this invention is to provide a novel method for the metalation of hydrocarbon polymers in solution with sodium, potassium, rubidium and/or cesium using a polytertiary amine or crown polyether as a chelating agent.

These and other objects and advantages of the present invention will become more apparent to those skilled in the art from the following detailed description and examples.

SUMMARY OF THE INVENTION

A new method has been discovered for preparing polymers containing a multiplicity of carbon-sodium,-potassium,-rubidium, and -cesium bonds distributed along the polymer chain. This is accomplished through the direct use of the free metal in the presence of chelating amines or crown polyethers without the necessity of a costly intermediate preparation of an organometallic compound. These metalated polymers are useful for the preparation of graft copolymers or for the introduction of functional groups to the polymer. Functional groups such as metal carboxylates, attached to a rubber backbone, are known to have improved green strength. This method also provides a synthetic route to novel graft copolymers, where the efficiency of grafting is very high.

The degree of metalation, i.e., the number of metalated sites provided on the polymer is controlled both by the number of replaceable hydrogens available in the polymer chain and by the ratio of metal to the replaceable hydrogens available. Theoretically, it is possible to replace all of the reactive hydrogen atoms with metal by employing a molar equivalent of the metal for the available active hydrogen sites. A lesser degree of replacement may be accomplished by using limited amounts of the metal so that as few as one or two active metal-carbon bonds are produced per polymer chain. The metalated polymers are useful in the preparation of chemically modified polymers including graft-modified polymers and copolymers. The metalated sites are available for anionic polymerization of anionically polymerizable monomers such as butadiene-1,3, styrene, isoprene and so forth as well as for reaction with agents such as ketones, aldehydes, $CO_2$, $R_3SiCl$ (R= alkyl), phenylisocyanate, diethylchlorophosphate, diphenylchlorophosphine, $SO_2$, ethylene oxide, ethylene imine, N,N'-diphenyl-p-quinonediimine and caprolactam and the like.

The degree of metalation can be controlled, as mentioned, by varing the ratio of complex to polymer. However, at certain high concentrations of polydienes and metal, gelation or cross-linking and insolubilization of polymer may occur so that very dilute solutions may be required for high metalations if such are desired.

DISCLOSURE OF DETAILS AND PREFERRED EMBODIMENTS

The metals employed in the present process are sodium, potassium, rubidium or cesium or mixtures of the same or their alloys, compounds or intermetallic compounds. These metals are employed in elemental form as filings, as finely divided dispersions of the metal in an inert liquid carrier such as a hydrocarbon oil, or as liquids. Finely divided metal particles giving a greater surface area provide a better reaction rate. At elevated metalation temperatures some of these metals may melt to provide a better dispersion and better contact with the polymer. Some of the alloys or metal mixtures such as those of K and Na containing 10 to 50% by weight of Na have melting points below 25°C. (about room temperature). See "Comprehensive Inorganic Chemistry," Sneed and Brasted, Vol. Six, D. van Nostrand Company, Inc., New York, 1957 and "Inorganic Chemistry," Ephraim, 6th Edition, Interscience Publishers, Inc., New York, Revised 1954.

The chelating agent, free of aliphatic unsaturation used in the practice of the present invention is a hydrocarbon polytertiary amine or a hydrocarbon crown polyether and which is not reactive with the carbanion formed.

The amines have from 2 to 4 tertiary nitrogen atoms. Examples of the amines are tetramethylethylene diamine, sparteine, tetramethyl-1,2-diamino cyclohexane, tris-(2-dimethylaminoethyl) amine, pentamethyl diethylene triamine, hexamethyltriethylene tetramine, triethylene diamine, N,N'-dimethyl piperazine, tetramethyl-1,4-diamino cyclohexane, tetraethylethylene diamine, tetradecylethylene diamine, tetraoctyl hexylenediamine, tetra-(mixed alkyl) alkylene diamines, and their isomers, homologs and mixtures of the same. These amines are known compounds as shown by the references discussed supra, as well as by Polymer Preprints 13, 649–666 (1972)(Am. Chem. Soc., Div. of Polymer Chemistry).

The crown or cyclic polyethers have from 5 to 10 oxygen atoms in the ring each separated from the next oxygen atom by 2 carbon atoms. While the rings may be open, it is preferred that they are closed. Examples of such materials to use in the present process are 3,4,12,13-dibenzo-2,5,8,11,14-pentaoxapentadeca-3,12-diene; 2,3,11,12-dibenzo-1,4,7,10,13,16-hexaoxacyclooctadeca-2,11-diene(dibenzo-18-crown-6); and 2,3,11,12-dicyclohexyl-1,4,7,10,13,16-hexaoxacyclooctadecane(dicyclohexyl-18-crown-6). Other examples of these crown polyethers (using abbreviated names in which, in order, are recited the number and type of rings, total number of atoms in the polyether ring, the class name and the number of oxygen atoms in the ring) are benzo-15-crown-5; dibenzo-21-crown-7; dicyclohexyl-24-crown-8; dibenzo-30-crown-10; dibenzo-15-crown-5; 18-crown-6; dicyclohexyl-21-crown-7; tribenzo-18-crown-6; and tetrabenzo-24-crown-8 and the like and mixtures thereof. Isomers and homologs of these crown polyethers can likewise be used. These crown polyethers are well known to those skilled in the art as shown by C. J. Pederson, J. Am. Chem. Soc. 89, 7017–7036 (1967) and subsequent publications by C. J. Pederson. See, also, Aldrichimica acta, Volume 4, Number 1, pages 1 to 5 and 13, 1971.

The chelating agent is used in an amount of from about 0.1 to 2.5 moles per gram atom of the metal. Preferably the chelating agent is used in an amount of from about 0.2 to 1.5 moles per gram atom of the metal to provide an increase in the rate of metalation of the polymer.

The hydrocarbon polymers to be metalated according to the present invention are rubbery or resinous hydrocarbon polymers, including copolymers, having aliphatic ethylenic unsaturation. They may be made by bulk, solution, heterogeneous liquid phase, or aqueous emulsion processes in which free radical catalysts, Alfin catalysts, Friedel-Crafts catalysts, Ziegler catalysts, ionic catalysts, metal catalysts, organometallic catalysts and the like are employed. Depending on polymerization conditions such as time, temperature, catalysts, solvents, dispersants, degree of conversion and so forth, the polymers may have a high or a low molecular weight, can exhibit an alternating, random or stereoregular structure and can be branched or linear. These polymers also include graft polymers, pure block polymers, graded block polymers, jumped polymers, telechelic polymers and so forth. Preferably these polymers have little or no cross-linking or gel to facilitate dissolution in the hydrocarbon solvent. Moreover, catalysts, catalyst residues, stabilizers, emulsifiers, antioxidants and the like used during polymerization of these polymers and which may interfere with the metalation reaction also should preferably be removed or rendered inactive prior to conducting the metalation of the polymers. These polymers and copolymers can be made from monomers like isoprene, 2,3-dimethylbutadiene, butadiene-1,3 and other polymerizable dienes and the like and mixtures thereof and mixtures of one or more of these monomers with copolymerizable monomers like styrene, alpha-methylstyrene, p-tertiary butylstyrene, divinyl benzene, methyl vinyl toluene, paravinyl toluene, isobutylene, ethylene, propylene and the like and mixtures thereof. Examples of such polymers are natural rubber, balata, butadiene-1,3/styrene rubbery copolymers (SBR), high styrene-butadiene-1,3 resins (about 60–90% styrene), solution polymerized polybutadiene 1,3 or butadiene-1,3/styrene copolymers, resinous or rubbery butadiene-1,3/styrene or styrene/butadiene-1,3/styrene block copolymers, rubbery isobutylene/isoprene copolymers (Butyl rubber), rubbery ethylene/propylene/diene copolymers (Nordel EPDM, du Pont), and the like and mixtures thereof. These polymers, including copolymers, are well known to the art as well as processes for making them. In this connection reference is made to U.S. Pat. Nos. 2,755,270; 3,231,635; 3,251,905; 3,265,765; 3,287,333; 3,377,404; 3,445,543; 3,449,469; and 3,726,933; British Patent Nos. 1,053,596; 1,120,404; 1,145,923 and 1,259,932; "Synthetic Rubber," Whitby, Davis and Dunbrook, John Wiley & Sons, Inc., New York, 1954; and "Vinyl And Related Polymers," Schildknecht, John Wiley & Sons, Inc., New York, 1952.

The solvents used in the metalation of the above polymers should be solvents which are solvents for the polymer, metalated polymer, and the chelating agent. The solvents to use are hydrocarbon solvents, liquid at room temperature (about 25°C.) or below and essentially free of aliphatic unsaturation. The solvents should be essentially inert with respect to the metalation of the polymers; that is, they should not interfere with the polymer or metalated polymer, with the metalation reaction, with the action of the chelating agent, nor with the metal itself although the solvent may become somewhat metalated in which case more metal may be required for the desired metalation. Examples of solvents for use in practicing the method of the present invention are benzene, toluene, the xylenes, the trimethylbenzenes, hexane, heptane, octane, nonane, cyclohexane, cycloheptane, cyclooctane, cyclopentane, decane, dodecane, butyl benzene, isopropyl benzene, 2,5-dimethylhexane, 1,3-dimethyl cyclohexane, isopropyl cyclohexane, phenyl cyclohexane and the like and mixtures thereof.

Times and temperatures used for metalation will be those needed to effect metalation. In general, temperatures during solution metalation can vary from about 0° to 100°C., preferably from about 40° to 90°C. The reaction rate increases with increasing temperature. Time for metalation will be dependent on the temperature, amount of metal and chelating agent used, type of polymers employed and so forth. In solvent metalation, operations are conducted on a basis of not over about 15 to 20% polymer solids concentration in the solvent to enable ready heat transfer and processing. Preferably to facilitate metalation and avoid gelation, very dilute solutions of not over about 5% polymer solids are employed. Liquid polymers require less solvent.

Metalation should, of course, be conducted in a closed reactor, preferably a pressure reactor, fitted with a stirrer, heating and cooling means, with means to flush with or pump in an inert gas such as nitrogen, neon, argon and so forth in order to metalate under inert or non-reactive conditions, with means to charge polymer, solvent, metal and chelating agent, and with means to recover the resulting metalated polymer and so forth.

After metalation the polymer may be treated, as discussed above, with polymerizable monomers to provide a graft polymer with rubbery or resinous properties or to provide a polymer with —COOH groups for reaction with alcohols to form polyesters or with —OH groups for reaction with polyisocyanates to form polyurethanes. The metalated sites are also useful for reaction with phosphorous compounds to improve the flame resistance of the polymer. The metalated polymers thus further treated can be used as paints, protective coatings for fabrics; in making fibers and textiles, body and engine mounts for automobiles, gaskets, treads and carcasses for tires, golf balls, golf ball covers, belts, hose, shoe soles, motor mounts, foamed plastic insulation for buildings, tote boxes, electric wire and cable insulation, and as plasticizers and polymeric fillers for other plastics and rubbers. These treated or modified metalated polymers can be mixed with sulfur or sulfur furnishing materials, peroxides, carbon black, $SiO_2$, $TiO_2$, $Sb_2O_3$, red iron oxide, phthalocyanine blue or green, tetramethyl or ethyl thiuram disulfide, benzothiazyl disulfide and the like. Stabilizers, antioxidants, UV light absorbers and other antidegradants can be added to these polymers. They can also be blended with other polymers like natural rubber, butyl rubber, butadienestyrene-acrylonitrile terpolymers, polychloroprene, SBR, polyurethane elastomers and so forth.

The following examples will serve to illustrate the present invention with more particularity to those skilled in the art. In these examples and throughout the remaining specification and claims all parts and percentages are by weight unless otherwise specified.

EXAMPLE I

In a drybox, 5.0 grams of a dispersion containing 40% by weight of sodium metal in mineral oil, 1 micron size, from Matheson, Coleman and Bell, were charged to a 1-quart beverage bottle. The bottle was capped with a crown cap containing holes for needles and a butyl rubber gasket. A solution of 10.0 grams of a styrene-(A)-butadiene(B), graded ABA block polymer containing 41.8% by weight styrene, 58.2% butadiene, having 59% trans-1,4 and 11% vinyl, and having a number average molecular weight of 258,000, in 471.7 grams of dry cyclohexane was added by way of a transfer needle and 15.0 (about 1.5 moles per gram atom of sodium) tetramethylethylenediamine (TMEDA) were added by syringe. The bottle was charged to a 50°C. bath and stirred for 5 days. At this time, the organometallic content of the polymer was determined by termination with tritiopropanol, isolation of the polymer and assay of the tritium (isotope of H, mass=3) content of the resulting polymer. The polymer was found to contain 0.265 milliequivalent of tritium per gram of polymer. The organometallic content of the polymer was thus at least 0.265 milliequivalent per gram, or the polymer had an average of 70.1 carbon-sodium sites per chain. Prior to metalation the ABA polymer was dissolved in benzene and reprecipitated with methanol.

EXAMPLE II

The method of this example was similar to that of Example I, above. 5.4 grams of the sodium dispersion were allowed to react with 8.0 grams of the ABA polymer in 428.1 grams of dry cyclohexane at 80°C for 4 days in the presence of 5.5 grams (0.5 mole per gram atom of sodium) of TMEDA to give a polymer containing 0.378 milliequivalent per gram of polymer of organometallic (sodium bonded directly to a carbon atom of the polymer chain). Continuation of the metalation reaction to a sodium content of 0.5 meq/gm of polymer resulted in polymer insolubilization in the solvent.

EXAMPLE III

The method of this example was similar to that of Example I, above. 5.1 grams of the sodium dispersion were allowed to react with 8.0 grams of the ABA polymer in 425.4 grams of dry cyclohexane for 4 days at 80°C. in the absence of TMEDA. In this case, the organometallic content of the polymer was found to be only 0.0041 milliequivalent per gram or about 1.0 carbon-sodium site (or sodium atom) per chain.

EXAMPLE IV

The method of this example was similar to that of Example I, above, except that only a small sample was used for the tritiation analysis. 7.8 grams of the sodium dispersion were allowed to react with 8.0 grams of the ABA polymer in 411.5 grams of dry cyclohexane for 1 day at 50°C. in the presence of 7.9 (0.5 mole per gram atom of sodium) of TMEDA. The organometallic content was found to be 0.235 milliequivalent per gram of polymer. The metalated polymer was carboxylated by transferring the solution, by transfer needle, to a saturated solution of carbon dioxide in dry tetrahydrofuran at 5°C. and 10 psi pressure. After precipitation the resulting polymer was found to have an acid equivalent weight of 11,400.

EXAMPLE V

The method of this example was similar to that of Example 4, above. 7.4 grams of the sodium dispersion were allowed to react with 8.0 grams of the ABA polymer in 424.4 grams of dry cyclohexane at 50°C. for 4 days in the presence of 15.0 grams (1.0 mole per gram atom of sodium) of TMEDA. The resulting polymer, containing 0.313 milliequivalent per gram of polymer of organometallic, was reacted with 2.0 grams of phenyl isocyanate to yield a polymer which contained 0.75% by weight of nitrogen.

EXAMPLE VI

The method of this example was similar to that of Example 4, above. 6.1 grams of the sodium dispersion were allowed to react with 8.0 grams of the ABA polymer in 417.4 grams of dry cyclohexane at 50°C. for 4 days in the presence of 3.0 grams (0.24 mole per gram atom of sodium) of TMEDA. The resulting polymer, containing 0.205 milliequivalent per gram of polymer of organometallic, was reacted further with 2.0 grams of diethyl chlorophosphate to give a polymer which contained 0.89% by weight of phosphorous.

EXAMPLE VII

The method of this example was similar to that of Example I, above. 4.7 grams of the sodium dispersion were allowed to react with 10.0 grams of the ABA polymer in 372.2 grams of dry cyclohexane and 131.4 grams of dry toluene at 50°C. for 2 days in the presence of 4.75 grams (0.5 mole per gram atom of sodium) of TMEDA. The resulting polymer contained 0.142 milliequivalent of organometallic per gram of polymer while the toluene was found to have 0.0026 milliequivalent of organometallic per gram of toluene.

EXAMPLE VIII

The method of this example was similar to that of Example 4, above. 5.8 grams of the sodium dispersion were allowed to react with 10.2 grams of polystyrene in 423.8 grams of dry cyclohexane at 50°C. for 3 days in the presence of 5.6 grams (0.48 mole per gram atom of sodium) of TMEDA. The organometallic content of the resulting polymer was found to be 0.0020 milliequivalent per gram. Carboxylation of the polymer gave a material with an acid equivalent weight of 399,000. The polystyrene used in this example was emulsion polymerized and had a number average molecular weight of about 50,000. Prior to metalation the polystyrene was dissolved in benzene and reprecipitated with methanol.

EXAMPLE IX

The method of this example was similar to that of Example I, above. 8.0 grams of the sodium dispersion were allowed to react with 10.2 grams of polybutadiene in 384.9 grams of dry cyclohexane at 50°C. for 7 days in the presence of 8.2 grams (0.5 mole per gram atom of sodium) of TMEDA to give a polymer containing 0.176 milliequivalent of organometallic per gram of polymer. The polybutadiene employed was a commercially available solution polymerized polybutadiene-1,3 (using a stereo-specific catalyst system). It had a cis content of about 93%, an ash of about 0.75% max., a Raw Mooney (ML-4 at 212°F.) of 40–50, an organic acid content of 2.00% max., and a non-staining stabilizer.

EXAMPLE X

The method of this example was similar to that of Example I, above. A series of runs were made to metalate the ABA polymer in the presence of added sodium oxide. The conditions and results are given in Table I. In each case, 8.0 grams of the ABA polymer were used in 350 to 380 grams of dry cyclohexane and the reactions were carried out for 3 days at 80°C.

TABLE I

| Effect of Added Sodium Oxide on Metalation | | | |
|---|---|---|---|
| Wt. Sodium Dispersion | Wt. TMEDA | Wt. $Na_2O$ | Tritium Content (meq) of Resulting Polymer (gm) |
| 0 | 0 | 2.92 | 0.0003 |
| 0 | 5.7 | 2.92 | 0.0008 |
| 5.57 | 0 | 2.71 | 0.0078 |
| 5.87 | 11.1 | 2.73 | 0.324 |
| 6.04 | 6.3 | 2.70 | 0.401 |
| 5.40 | 5.5 | 0 | 0.378 |

Since the work of Morton and Taylor supra suggested that sodium oxide might be important in a metalation procedure and since the presence of some sodium oxide in the sodium dispersion used herein cannot be ruled out, this series of runs were made to determine the effect of added sodium oxide on the metalation system. This example shows that, in the absence of the sodium dispersion, sodium oxide will not effectively metalate the ABA polymer whether TMEDA is present or not. Also, no significant amount of metalation was obtained with sodium dispersion and added sodium oxide in the absence of TMEDA. The total amount of metalation obtained when all three are present is the same as that normally obtained in the absence of sodium oxide. Therefore, the presence of sodium oxide has no effect on the present metalation system.

EXAMPLE XI

The method of this example was similar to that of Example 4, above. 10.9 grams of the sodium dispersion were allowed to react with 15.0 grams of an anionically solution polymerized liquid polybutadiene (25% trans-1,4 and 60% vinyl) having a number average molecular weight of 1540 and having no functional groups on the end in 353 grams of dry hexane containing 0.5 mole of TMEDA per gram atom of sodium. The reaction was carried out at 50°C. for 3 days to give a polymer which analyzed at 0.701 milliequivalent of organometallic content per gram of polymer. Carboxylation gave a material with an acid equivalent weight of 2700.

EXAMPLE XII

The method of this example was similar to that of Example 4, above. 5.14 grams of the sodium dispersion were allowed to react with 10.0 grams of an anionically solution polymerized liquid poly(butadiene-co-styrene), containing 6% styrene, free of functional groups on the end, and having a number average molecular weight of 5110, in 395 grams of dry hexane containing 0.5 mole of TMEDA per gram atom of sodium. The reaction was carried out at 50°C. for 3 days. Tritiation analysis of the resulting polymer indicated an organometallic content of 0.270 milliequivalent per gram of polymer. Carboxylation gave a material with an acid equivalent weight of 3640 (about 1.6 carboxyl groups per chain).

The embodiments of the invention in which an exclusive property or privilege is claimed are defined as follows:

1. The method for metalating a hydrocarbon polymer having aliphatic ethylenic unsaturation and having replaceable hydrogen atoms in the polymer chain which comprises reacting said polymer in solution in a liquid hydrocarbon solvent which is essentially free of aliphatic unsaturation and of sodium oxide with metallic sodium in admixture with a hydrocarbon polytertiary amine free of aliphatic unsaturation and having from 2 to 4 tertiary nitrogen atoms as a chelating agent at a temperature of from about 0° to 100°C. and for a time sufficient to effect bonding of said sodium to said polymer by means of a direct carbon to sodium bond, said chelating agent being used in an amount of from about 0.1 to 2.5 moles per gram atom of said sodium and said chelating agent being unreactive with the carbanion formed on said polymer.

2. The method according to claim 1 in which said amine is selected from the group consisting of tetramethylethylene diamine, sparteine, tetramethyl-1,2-diamino cyclohexane, tris-(2-dimethylaminoethyl) amine, pentamethyl diethylene triamine, hexamethyltriethylene tetramine, triethylene diamine, N,N'-dimethyl piperazine, tetramethyl-1,4-diamino cyclohexane, tetraethylethylene diamine, tetradecylethylene diamine, and tetraoctyl hexylenediamine, and mixtures of the same.

3. The method according to claim 1 in which said solvent is selected from the group consisting of hexane, heptane, octane, nonane, cyclohexane, cycloheptane, cyclooctane, cyclopentane, decane, dodecane, 2,5-dimethylhexane, 1,3-dimethyl cyclohexane, and isopropyl cyclohexane and mixtures thereof.

4. The method according to claim 1 where the temperature is from about 40° to 90°C. and said chelating agent is used in an amount of from about 0.2 to 1.5 moles per gram atom of said sodium.

5. The method according to claim 4 in which said polymer is selected from the group consisting of polybutadiene-1,3 and copolymers of butadiene-1,3 and styrene.

6. The method according to claim 4 in which said polytertiary amine is tetramethylethylene diamine.

* * * * *